US009158569B2

(12) United States Patent
Mitra et al.

(10) Patent No.: US 9,158,569 B2
(45) Date of Patent: Oct. 13, 2015

(54) VIRTUAL INTERRUPT DELIVERY FROM A GRAPHICS PROCESSING UNIT (GPU) OF A COMPUTING SYSTEM WITHOUT HARDWARE SUPPORT THEREFOR

(71) Applicant: NVIDIA Corporation, Santa Clara, CA (US)

(72) Inventors: Surath Raj Mitra, Kolkata (IN); Neo Jia, Fremont, CA (US); Kirti Wankhede, Maharashtra (IN)

(73) Assignee: NVIDIA Corporation, Santa Clara, CA (US)

( * ) Notice: Subject to any disclaimer, the term of this patent is extended or adjusted under 35 U.S.C. 154(b) by 262 days.

(21) Appl. No.: 13/764,782

(22) Filed: Feb. 11, 2013

(65) Prior Publication Data
US 2014/0229935 A1    Aug. 14, 2014

(51) Int. Cl.
*G06F 9/455* (2006.01)
*G06F 13/24* (2006.01)
*G06F 13/32* (2006.01)
*G06F 9/48* (2006.01)

(52) U.S. Cl.
CPC ............ *G06F 9/45558* (2013.01); *G06F 9/455* (2013.01); *G06F 9/4555* (2013.01); *G06F 9/45533* (2013.01); *G06F 9/45545* (2013.01); *G06F 9/48* (2013.01); *G06F 9/4806* (2013.01); *G06F 9/4812* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 7,209,994 B1 * | 4/2007 | Klaiber et al. ................ 710/264 |
| 8,131,901 B2 | 3/2012 | Mansell et al. | |
| 8,286,162 B2 | 10/2012 | Neiger et al. | |
| 2008/0005297 A1 * | 1/2008 | Kjos et al. ..................... 709/223 |
| 2008/0077917 A1 * | 3/2008 | Chen et al. ........................ 718/1 |
| 2008/0215770 A1 * | 9/2008 | Liu et al. ......................... 710/30 |
| 2011/0102443 A1 * | 5/2011 | Dror et al. ..................... 345/522 |
| 2011/0145458 A1 | 6/2011 | Narasimhan | |
| 2013/0047157 A1 * | 2/2013 | Suzuki ............................. 718/1 |
| 2013/0055261 A1 | 2/2013 | Han et al. | |
| 2013/0229421 A1 * | 9/2013 | Cheng et al. .................. 345/522 |
| 2014/0173600 A1 * | 6/2014 | Ramakrishnan Nair .......... 718/1 |

* cited by examiner

*Primary Examiner* — Charles Swift
(74) *Attorney, Agent, or Firm* — Zilka-Kotab, PC

(57) ABSTRACT

A method includes loading a driver component on a hypervisor of a computing system including a Graphics Processing Unit (GPU) without hardware support for virtual interrupt delivery, and loading an instance of the driver component on each of a number of VMs consolidated on a computing platform of the computing system. The method also includes allocating a memory page associated with work completion by the each of the number of VMs thereto through a driver stack executing on the hypervisor, and sharing the memory page with the driver component executing on the hypervisor. Further, the method includes delivering, through the hypervisor, an interrupt from the GPU to an appropriate VM based on inspecting the memory page associated with the work completion by the each of the number of VMs.

17 Claims, 3 Drawing Sheets

VIRTUAL INTERRUPT DELIVERY FROM A GRAPHICS PROCESSING UNIT (GPU) OF A COMPUTING SYSTEM WITHOUT HARDWARE SUPPORT THEREFOR

FIELD OF TECHNOLOGY

This disclosure relates generally to virtualized computing environments and, more particularly, to virtual interrupt delivery from a Graphics Processing Unit (GPU) of a computing system without hardware support therefor.

BACKGROUND

A computing system (e.g., a server) may include a Graphics Processing Unit (GPU). A hypervisor on the computing system may consolidate Virtual Machines (VMs) on a computing platform of the computing system including the GPU. The VMs may share resources associated with the computing platform. The GPU may be a Peripheral Component Interconnect Express (PCIe)-based device that supports Single Root Input/Output virtualization (SR-IOV). SR-IOV may be designed to deliver interrupts generated in the computing platform to multiple operating system driver stacks. However, the aforementioned delivery may be associated with high implementation costs and/or complexity for devices such as GPUs where high performance is tied to an application state being closely coupled to hardware.

In the case of a non-SR-IOV based GPU, a single driver stack may execute on the hypervisor, and VMs may be multiplexed on top of the single driver stack. This may allow for interrupt delivery to the hypervisor; however, performance may be reduced because applications executing in the VMs are no longer closely coupled to the GPU hardware.

Performance may be improved by executing a GPU driver stack in each VM; however, for non SR-IOV based GPU hardware, multiplexing hardware for interrupt delivery may prove to be a challenge. One approach to address the challenge may be to service GPU interrupts in the hypervisor, and, in turn, steer virtual interrupts generated at the hypervisor to the VMs. However, without contextual information normally held within the GPU driver stack, it may be impossible for the hypervisor to actually steer virtual interrupts to the VMs.

SUMMARY

Disclosed are a method, a device and/or a system of virtual interrupt delivery from a Graphics Processing Unit (GPU) of a computing system without hardware support therefor.

In one aspect, a method includes loading a driver component on a hypervisor of a computing system including a GPU without hardware support for virtual interrupt delivery. The hypervisor is configured to consolidate a number of Virtual Machines (VMs) on a computing platform of the computing system including the GPU and to virtualize resources thereof. The method also includes loading an instance of the driver component on each of the number of VMs, allocating a memory page associated with work completion by the each of the number of VMs thereto through a driver stack executing on the hypervisor, and sharing the memory page with the driver component on the hypervisor. Further, the method includes delivering, through the hypervisor, an interrupt from the GPU to an appropriate VM based on inspecting the memory page associated with the work completion by the each of the number of VMs.

In another aspect, a non-transitory medium, readable through a computing system and including instructions embodied therein that are executable through the computing system, is disclosed. The non-transitory medium includes instructions to load a driver component on a hypervisor of the computing system including a GPU without hardware support for virtual interrupt delivery. The hypervisor is configured to consolidate a number of VMs on a computing platform of the computing system including the GPU and to virtualize resources thereof. The non-transitory medium also includes instructions to load an instance of the driver component on each of the number of VMs, instructions to allocate a memory page associated with work completion by the each of the number of VMs thereto through a driver stack executing on the hypervisor, and instructions to share the memory page with the driver component on the hypervisor.

Further, the non-transitory medium includes instructions to deliver, through the hypervisor, an interrupt from the GPU to an appropriate VM based on inspecting the memory page associated with the work completion by the each of the number of VMs.

In yet another aspect, a computing system includes a memory, a GPU without hardware support for virtual interrupt delivery, and a hypervisor configured to consolidate a number of VMs on a computing platform of the computing system including the GPU and to virtualize resources thereof. The hypervisor includes a driver component loaded thereon. Each of the number of VMs executes an instance of the driver component loaded thereon. The hypervisor executes a driver stack configured to allocate a memory page associated with work completion by the each of the number of VMs thereto and to share the memory page with the driver component on the hypervisor. The hypervisor is further configured to deliver an interrupt from the GPU to an appropriate VM based on inspecting the memory page associated with the work completion by the each of the number of VMs.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a device and/or a system of virtual interrupt delivery from a Graphics Processing Unit (GPU) of a computing system without hardware support therefor. Although the present embodiments have been described with reference to specific example embodiments, it will be evident that various modifications and changes may be made to these embodiments without departing from the broader spirit and scope of the various embodiments.

Figure 1:
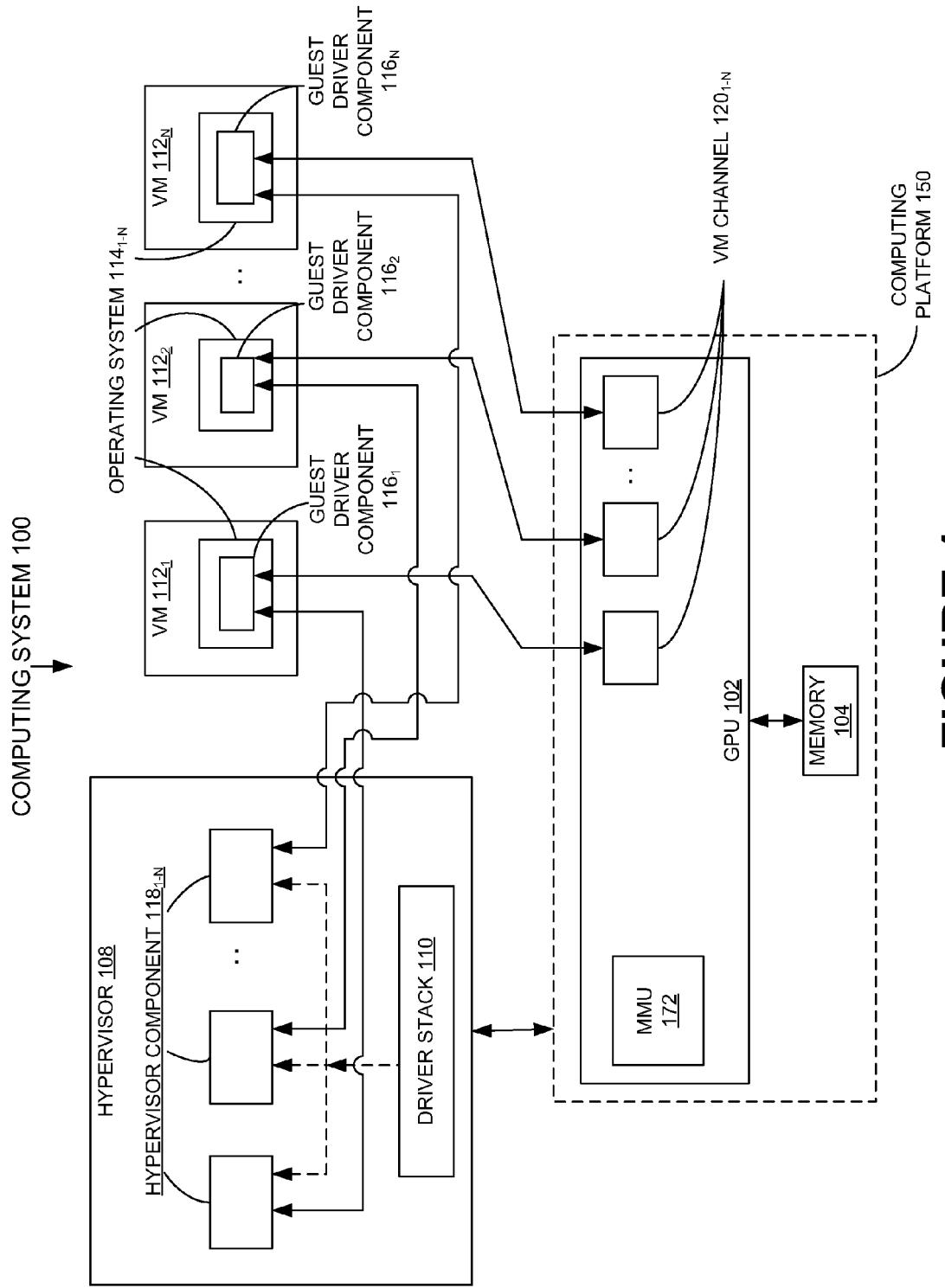
FIG. 1 is a schematic view of a hypervisor-based computing system including a Graphics Processing Unit (GPU) without hardware support for virtual interrupt delivery.

FIG. 1 shows a hypervisor-based computing system 100 including a Graphics Processing Unit (GPU) 102 communicatively coupled to a memory 104 (e.g., volatile memory and/or non-volatile memory), with GPU 102 not having hardware support for virtual interrupt delivery. GPU 102 may have a Memory Management Unit (MMU) 172 associated therewith. Memory 104 may include storage locations configured to be addressable through GPU 102 (e.g., nVIDIA®'s VGX™ GPU). GPU 102 and memory 104 may be part of a computing platform 150 associated with computing system 100. It is obvious that computing system 100 may also include a Central Processing Unit (CPU) (not shown). MMU 172 may be configured to map memory 104 between address space of the CPU and GPU 102.

A hypervisor 108 may execute on computing platform 150; hypervisor 108 may be a high-level system software or a program enabling multiple operating systems share hardware resources of computing platform 150. Hypervisor 108 may control GPU 102 and memory 104 and resources of computing platform 150 to abstract each of the multiple operating systems; hypervisor 108 may consolidate virtual machines (VMs) on computing platform 150. Hardware associated with computing platform 150 may transmit a signal to GPU 102 indicating an event requiring immediate attention therefrom; GPU 102 may respond to the signal by suspending current activities thereof, initiating saving of state information thereof, generating an interrupt and then attending to requirements associated with the event. Once the requirements are attended to, GPU 102 may resume the current activities previously suspended.

For example, when an application executes inside a VM provisioned on computing platform 150, a guest driver component executing inside the VM may transmit commands to GPU 102 for rendering related to the execution. The aforementioned rendering may involve interrupts being generated.

FIG. 1 shows a driver stack 110 executing on hypervisor 108 and a number of VMs $112_{1-N}$ consolidated on computing platform 150. Each VM $112_{1-N}$ may execute a corresponding operating system $114_{1-N}$ therethrough. Each VM $112_{1-N}$ may also execute a guest driver component $116_{1-N}$ and may have a corresponding hypervisor component $118_{1-N}$ executing on hypervisor 108; hypervisor component $118_{1-N}$ may virtualize resources of GPU 102 and interact with the device emulation mechanism thereof (for example, hypervisor 108 may include a device emulation module therefor; components of a hypervisor and functionalities thereof are well-known to one of ordinary skill in the art; therefore, detailed discussion associated therewith has been skipped for the sake of brevity and convenience). Driver stack 110 may enable setting up of resources of GPU 102 (e.g., per VM channel $120_{1-N}$) for guest driver component $116_{1-N}$; once a guest driver component $116_{1-N}$ has requisite resources of GPU 102 allocated thereto, guest driver component $116_{1-N}$ may directly communicate with GPU 102, without intervention of driver stack 110.

Each VM $112_{1-N}$ may provide updates to GPU 102 over a corresponding VM channel $120_{1-N}$ (show as part of GPU 102) between GPU 102 and the each VM $112_{1-N}$. The architecture presented in FIG. 1 presents a significant challenge in distributing interrupts generated by GPU 102. Here, although performance and capability may be greatly improved through executing guest driver component $116_{1-N}$ on each VM $112_{1-N}$, multiplexing hardware associated with computing platform 150 for interrupt delivery may prove to be challenging. Interrupt delivery may be attempted through servicing interrupts from GPU 102 in hypervisor 108, and then steering virtual interrupts corresponding to the interrupts to appropriate VMs $112_{1-N}$. As guest driver component $116_{1-N}$ directly communicates with GPU 102 without intervention of hypervisor 108, driver stack 110 executing on hypervisor 108 may not possess contextual information to determine a VM $112_{1-N}$ generating a specific interrupt.

Figure 2:
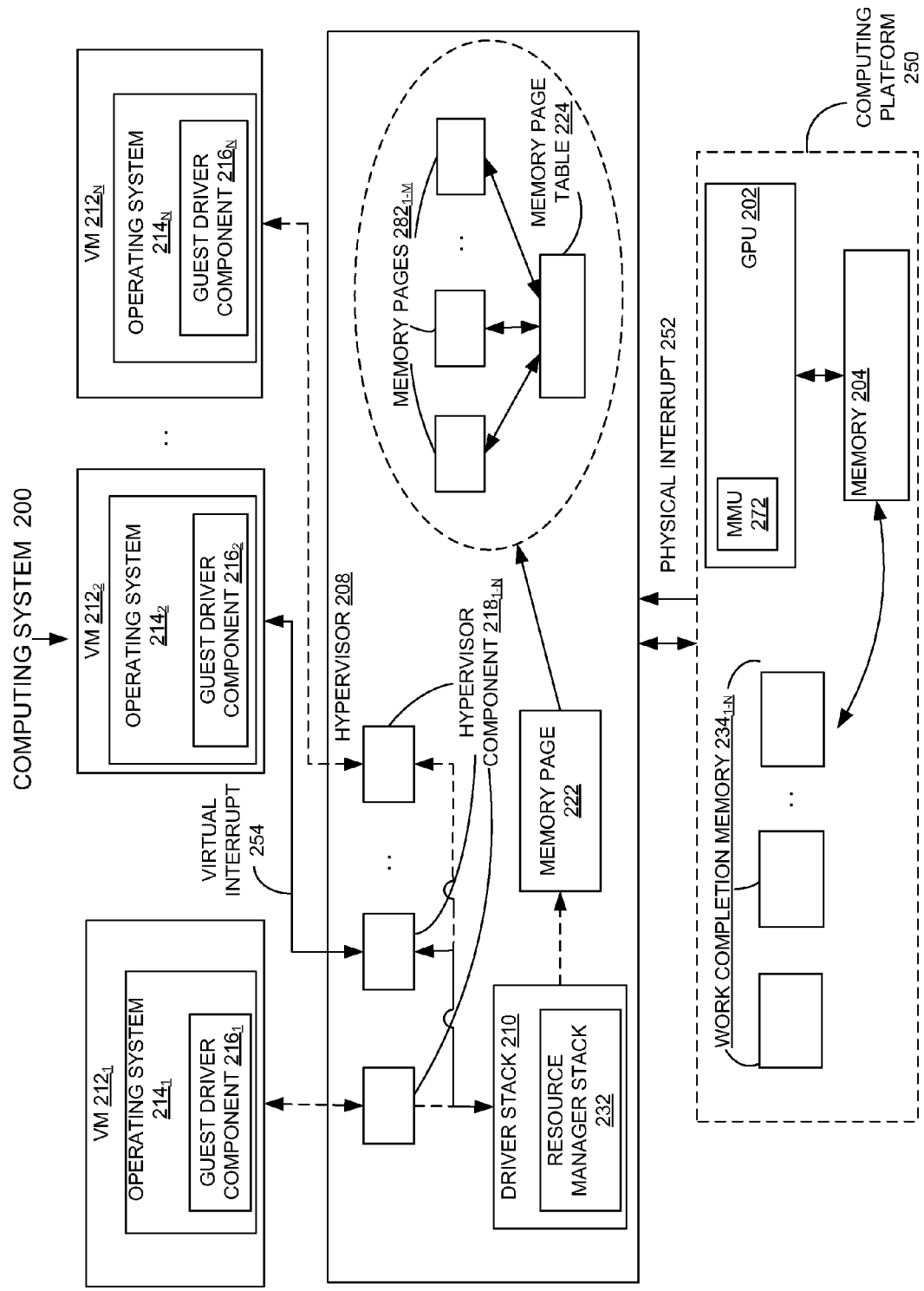
FIG. 2 is a schematic view of a hypervisor-based computing system configured to handle virtual interrupt delivery from a GPU thereof without hardware support therefor, according to one or more embodiments.

FIG. 2 shows a computing system 200 configured to handle virtual interrupt delivery from a GPU 202 thereof without hardware support therefor, according to one or more embodiments. Again, in one or more embodiments, GPU 202 may include an MMU 272 associated therewith. In one or more embodiments, analogous to FIG. 1, GPU 202 may be communicatively coupled to a memory 204, which includes storage locations configured to be addressable through GPU 202. In one or more embodiments, GPU 202 and memory 204 may, again, be part of a computing platform 250 associated with computing system 200. MMU 272, hypervisor 208, driver stack 210, VMs $212_{1-N}$, operating system $214_{1-N}$, guest driver component $216_{1-N}$, and hypervisor component $218_{1-N}$ in FIG. 2 are analogous to MMU 172, hypervisor 108, driver stack 110, VMs $112_{1-N}$, operating system $114_{1-N}$, guest driver component $116_{1-N}$ and hypervisor component $118_{1-N}$ of FIG. 1 respectively.

In one or more embodiments, driver stack 210 executing on hypervisor 208 may include a resource manager stack 232 to manage assignment of resources of computing platform 250 to VMs $212_{1-N}$. In one or more embodiments, driver stack 210 may allocate a memory page (e.g., a data structure) 222 associated with work completion by a VM $212_{1-N}$ (e.g., VM $212_2$). In one or more embodiments, the aforementioned memory page 222 may be shared with hypervisor component $218_{1-N}$ executing on hypervisor 208. In one or more embodiments, resource manager stack 232 may maintain mapping of all work completion memory pages $282_{1-M}$ related to VMs $212_{1-N}$ through a memory page table 224 (e.g., a data structure) associated therewith.

In one or more embodiments, hypervisor component $218_{1-N}$ may enable generation of virtual interrupts to VMs $212_{1-N}$ through hypervisor-specific mechanisms. For example, virtual interrupts may be generated by hypervisor 208 as a service. One or more hypervisor-specific mechanisms of generating virtual interrupts is well-known to one of ordinary skill in the art. Detailed discussion associated therewith has been skipped for the sake of brevity and convenience.

In one or more embodiments, hypervisor 208 may obtain information about an interrupt through resource manager stack 232 by means of events. In one or more embodiments, the appropriate guest driver component $216_{1-N}$ may program GPU 202 to post a notification in a work completion memory $234_{1-N}$ associated with a particular VM $212_{1-N}$ after a work buffer submitted by the particular VM $212_{1-N}$ is complete. In one or more embodiments, in accordance with the instruction, GPU 202 may post an appropriate notification and generate a physical interrupt following a completed state of the work buffer. In one or more embodiments, resource manager stack 232 may receive the aforementioned interrupt and may determine the corresponding VM $212_{1-N}$ (e.g., VM $212_2$) thereof by inspecting memory locations of all VMs $212_{1-N}$ sharing GPU 202. In one or more embodiments, resource manager stack 232 may then generate an event associated therewith, following which hypervisor 208 generates a virtual interrupt to the associated operating system $214_{1-N}$ (e.g., operating system $214_2$) executing on the VM $212_{1-N}$ (e.g., VM $212_2$), again, using the hypervisor-specific mechanism. Here, the physical interrupt generated by GPU 202 may be converted into a virtual interrupt through hypervisor 208.

Thus, in one or more embodiments, an interrupt may be delivered only to a specific VM $212_{1-N}$ (e.g., VM $212_2$) without affecting other VMs $212_{1-N}$ sharing GPU 202. FIG. 2 shows VM $212_2$ as having an interrupt (e.g., physical interrupt 252 and the corresponding virtual interrupt 254) delivered to operating system $214_2$.

In one or more embodiments, the interrupt delivery mechanism discussed above with reference to FIG. 2 may reduce interrupt load on computing system 200 and, therefore, improve overall system performance. It is to be noted that a driver component may first be loaded in hypervisor 208 (shown as hypervisor component $218_{1-N}$). In one or more embodiments, instances of the aforementioned driver component may execute on each VM $212_{1-N}$ as guest driver component $216_{1-N}$.

Further, it is to be noted that a virtual interrupt may be broadcast to each VM $212_{1-N}$ utilizing GPU 202 instead of being steered to the appropriate VM $212_{1-N}$ (e.g., $212_2$), as discussed above. Such a workaround may be suboptimal, resulting in many virtual interrupts being unnecessarily delivered to each VM $212_{1-N}$; the impact on performance of computing system 200, therefore, may be considerable.

In one or more embodiments, instructions associated with the operations discussed with regard to FIG. 2 (including the driver components) may be tangibly embodied on a non-transitory medium (e.g., Compact Disc (CD), Digital Video Disc (DVD), Blu-ray™ disc; or a hard-drive including a download of the instructions) readable through computing system 200. In one or more embodiments, the aforementioned instructions may be executable through computing system 200 to cause the optimal interrupt delivery discussed above. Alternately, the instructions may be packaged with an operating system executing on hypervisor 208 and/or an application executing on computing system 200. Variations therein are within the scope of the exemplary embodiments discussed herein.

Figure 3:
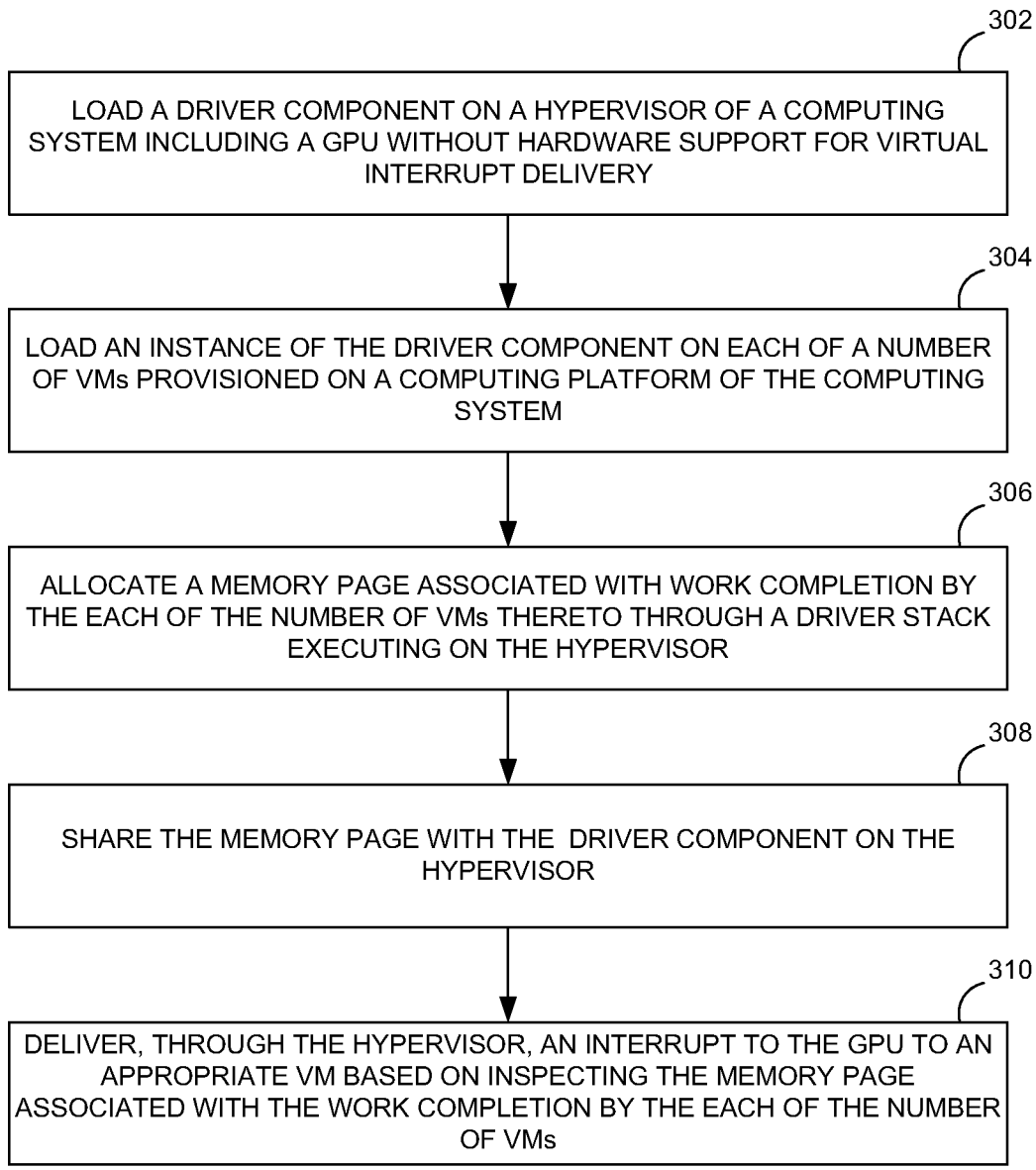
FIG. 3 is a process flow diagram detailing the operations involved in virtual interrupt delivery from the GPU of the hypervisor-based computing system of FIG. 2, according to one or more embodiments.

FIG. 3 shows a process flow diagram detailing the operations involved in virtual interrupt delivery from GPU 202 of computing system 200 without hardware support therefor, according to one or more embodiments. In one or more embodiments, operation 302 may involve loading a driver component (e.g., hypervisor component $218_{1-N}$) on hypervisor 208 of computing system 200 including GPU 202 without hardware support for virtual interrupt delivery. In one or more embodiments, hypervisor 208 may be configured to consolidate a number of VMs $212_{1-N}$ on computing platform 250 of computing system 200 including GPU 202 and to virtualize resources thereof. In one or more embodiments, operation 304 may involve loading an instance of the driver component (e.g., guest driver component $216_{1-N}$) on each of the number of VMs $212_{1-N}$. In one or more embodiments, operation 306 may involve allocating a memory page (e.g., memory page 222) associated with work completion by the each of the number of VMs $212_{1-N}$ thereto through driver stack 210 executing on hypervisor 208.

In one or more embodiments, operation 308 may involve sharing memory page 222 with the driver component executing on hypervisor 208. In one or more embodiments, operation 310 may then involve delivering, through hypervisor 208, an interrupt from GPU 202 to an appropriate VM $212_{1-N}$ based on inspecting memory page 222 associated with the work completion by the each of the number of VMs $212_{1-N}$.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a non-transitory machine-readable medium). For example, the various electrical structure and methods may be embodied using transistors, logic gates, and electrical circuits (e.g., Application Specific Integrated Circuitry (ASIC) and/or Digital Signal Processor (DSP) circuitry).

In addition, it will be appreciated that the various operations, processes, and methods disclosed herein may be embodied in a non-transitory machine-readable medium and/or a machine accessible medium compatible with a data processing system (e.g., client device 104), and may be performed in any order (e.g., including using means for achieving the various operations).

Accordingly, the specification and drawings are to be regarded in an illustrative rather than a restrictive sense.

What is claimed is:

1. A method comprising:
    loading a driver component on a hypervisor of a computing system including a Graphics Processing Unit (GPU) without hardware support for virtual interrupt delivery, the hypervisor being configured to consolidate a plurality of Virtual Machines (VMs) on a computing platform of the computing system including the GPU and to virtualize resources thereof;
    loading an instance of the driver component on each of the plurality of VMs;
    allocating a memory page associated with work completion by the each of the plurality of VMs thereto through a driver stack executing on the hypervisor;
    sharing the memory page with the driver component executing on the hypervisor;
    delivering, through the hypervisor, an interrupt from the GPU to an appropriate VM based on inspecting the memory page associated with the work completion by the each of the plurality of VMs; and
    programming, through the instance of the driver component on the each of the plurality of VMs, the GPU to post a notification in a work completion memory within the memory page associated with work completion by the each of the plurality of VMs after a work buffer submitted by the each of the plurality of VMs is complete.

2. The method of claim 1, further comprising maintaining mapping of memory pages associated with the work completion by the plurality of VMs through a resource manager stack executing on the hypervisor, the resource manager stack also being configured to manage assignment of the resources of the computing platform to the plurality of VMs.

3. The method of claim 2, further comprising obtaining information related to the interrupt from the resource manager stack.

4. The method of claim 1, further comprising: generating the interrupt through the GPU after the work buffer submitted by the each of the plurality of VMs is complete; and receiving the interrupt at the resource manager stack.

5. The method of claim 4, further comprising: determining, through the resource manager stack, the appropriate VM corresponding to the interrupt based on the inspection of the memory page associated with the work completion by the each of the plurality of VMs; and generating an event to the hypervisor following the determination of the appropriate VM through the resource manager stack.

6. The method of claim 5, further comprising generating a virtual interrupt corresponding to the interrupt through the hypervisor to an operating system executing on the particular VM.

7. A non-transitory medium, readable through a computing system and including instructions embodied therein that are executable through the computing system, comprising:
   instructions to load a driver component on a hypervisor of the computing system including a GPU without hardware support for virtual interrupt delivery, the hypervisor being configured to consolidate a plurality of VMs on a computing platform of the computing system including the GPU and to virtualize resources thereof;
   instructions to load an instance of the driver component on each of the plurality of VMs;
   instructions to allocate a memory page associated with work completion by the each of the plurality of VMs thereto through a driver stack executing on the hypervisor;
   instructions to share the memory page with the driver component executing on the hypervisor;
   instructions to deliver, through the hypervisor, an interrupt from the GPU to an appropriate VM based on inspecting the memory page associated with the work completion by the each of the plurality of VMs; and
   instructions to program, through the instance of the driver component on the each of the plurality of VMs, the GPU to post a notification in a work completion memory within the memory page associated with work completion by the each of the plurality of VMs after a work buffer submitted by the each of the plurality of VMs is complete.

8. The non-transitory medium of claim 7, further comprising instructions to maintain mapping of memory pages associated with the work completion by the plurality of VMs through a resource manager stack executing on the hypervisor, the resource manager stack also being configured to manage assignment of the resources of the computing platform to the plurality of VMs.

9. The non-transitory medium of claim 8, further comprising instructions to obtain information related to the interrupt from the resource manager stack.

10. The non-transitory medium of claim 7, further comprising:
   instructions to generate the interrupt through the GPU after the work buffer submitted by the each of the plurality of VMs is complete; and
   instructions to receive the interrupt at the resource manager stack.

11. The non-transitory medium of claim 10, further comprising:
   instructions to determine, through the resource manager stack, the appropriate VM corresponding to the interrupt based on the inspection of the memory page associated with the work completion by the each of the plurality of VMs; and
   instructions to generate an event to the hypervisor following the determination of the appropriate VM through the resource manager stack.

12. The non-transitory medium of claim 11, further comprising instructions to generate a virtual interrupt corresponding to the interrupt through the hypervisor to an operating system executing on the particular VM.

13. A computing system comprising:
   a memory;
   a GPU without hardware support for virtual interrupt delivery;
   a hypervisor configured to consolidate a plurality of VMs on a computing platform of the computing system including the GPU and to virtualize resources thereof, the hypervisor including a driver component loaded thereon, each of the plurality of VMs executing an instance of the driver component loaded thereon, the hypervisor executing a driver stack configured to allocate a memory page associated with work completion by the each of the plurality of VMs thereto and to share the memory page with the driver component executing thereon, and the hypervisor further being configured to deliver an interrupt from the GPU to an appropriate VM based on inspecting the memory page associated with the work completion by the each of the plurality of VMs; and
   wherein at least one of:
      information related to the interrupt is configured to be obtained from the resource manager stack, and
      the instance of the driver component on the each of the plurality of VMs is configured to program the GPU to post a notification in a work completion memory within the memory page associated with work completion by the each of the plurality of VMs after a work buffer submitted by the each of the plurality of VMs is complete.

14. The computing system of claim 13, wherein the hypervisor further executes a resource manager stack to maintain mapping of memory pages associated with the work completion by the plurality of VMs, the resource manager stack also being configured to manage assignment of the resources of the computing platform to the plurality of VMs.

15. The computing system of claim 14, wherein:
   the GPU is configured to generate the interrupt after the work buffer submitted by the each of the plurality of VMs is complete, and
   the interrupt is configured to be received at the resource manager stack.

16. The computing system of claim 15, wherein the resource manager stack is further configured to:
   determine the appropriate VM corresponding to the interrupt based on the inspection of the memory page associated with the work completion by the each of the plurality of VMs, and
   generate an event to the hypervisor following the determination of the appropriate VM.

17. The computing system of claim 16, wherein the hypervisor is further configured to generate a virtual interrupt corresponding to the interrupt to an operating system executing on the particular VM.

* * * * *